United States Patent
Peterson et al.

(12) 
(10) Patent No.: US 6,343,271 B1
(45) Date of Patent: Jan. 29, 2002

(54) ELECTRONIC CREATION, SUBMISSION, ADJUDICATION, AND PAYMENT OF HEALTH INSURANCE CLAIMS

(75) Inventors: Brian E. Peterson, Salt Lake City; John W. Kwant, Jr., Midvale, both of UT (US); Vaughn C. Cecil, Crossville, TN (US); Wayne A. Provost, Salt Lake City, UT (US)

(73) Assignee: P5 e.Health Services, Inc., Salt Lake City, UT (US)

( * ) Notice: Subject to any disclaimer, the term of this patent is extended or adjusted under 35 U.S.C. 154(b) by 0 days.

(21) Appl. No.: 09/118,668

(22) Filed: Jul. 17, 1998

(51) Int. Cl.[7] .............................................. G06F 17/60
(52) U.S. Cl. ................................................ 705/4; 705/2
(58) Field of Search ................................. 705/1, 2, 3, 4

(56) References Cited

U.S. PATENT DOCUMENTS

| | | | |
|---|---|---|---|
| 4,491,725 A | 1/1985 | Pritchard | 235/375 |
| 4,831,526 A | 5/1989 | Luchs et al. | 364/401 |
| 4,858,121 A | 8/1989 | Barber et al. | 364/406 |
| 5,225,976 A | 7/1993 | Tawil | 364/401 |
| 5,235,507 A | 8/1993 | Sackler et al. | 364/401 |
| 5,253,164 A | 10/1993 | Holloway et al. | 364/406 |
| 5,301,105 A | 4/1994 | Cummings, Jr. | 364/401 |
| 5,359,509 A | 10/1994 | Little et al. | 364/401 |
| 5,519,607 A | 5/1996 | Tawil | 364/401 |
| 5,523,942 A | 6/1996 | Tyler et al. | 364/401 |
| 5,644,778 A | 7/1997 | Burks et al. | 395/800 |
| 5,704,044 A | 12/1997 | Tarter et al. | 395/204 |
| 5,903,873 A | 5/1999 | Peterson et al. | 705/4 |
| 5,911,132 A * | 6/1999 | Sloane | 705/3 |
| 5,915,241 A | 6/1999 | Giannini | 705/2 |
| 5,930,759 A * | 7/1999 | Moore et al. | 705/2 |
| 6,003,007 A * | 12/1999 | DiRienzo | 705/4 |
| 6,012,035 A | 1/2000 | Freeman, Jr. et al. | 705/2 |
| 6,112,183 A * | 8/2000 | Swanson et al. | 705/2 |

FOREIGN PATENT DOCUMENTS

JP 2001 076055 * 3/2001 .......... G06F/17/60

OTHER PUBLICATIONS

Website data from "Claimsnet.com" located at www.claimsnet.com.*

Article entitled "Healtheon: Zigging and zagging to adjust to health care realities", published in Health Management Technologies, Jul. 1997.*

Article entitled "Claimsnet Flies IPO to Fund Internet Service", published in Dallas Business Journal, May 8, 1998.*

Tanner, Lisa Claimsnet files to IPO to fund Internet service Dallas Business Journal, May 8, 1998, vol. 21 Issue 37, p10, 1/2p.

(List continued on next page.)

*Primary Examiner*—Sam Rimell
(74) *Attorney, Agent, or Firm*—Workman, Nydegger & Seeley

(57) ABSTRACT

A claims processing system for electronically reviewing and adjudicating medical insurance claims. The claims processing systems include a benefits system, an automated adjudication system, a payment system, and a payment tracking system. The benefits system allows patients and health care providers to access patient and benefits information on-line. Using the automated adjudication system, health care providers may electronically prepare and submit claims for payment. Before a claim is submitted, a claims precheck process is used to determine whether the claim may be automatically adjudicated or instead must be manually adjudicated. If manual adjudication is indicated, the health care provider may the claim in an effort to achieve automated adjudication prior to claim submission. The claims processing system performs automatic adjudication on submitted claims or forwards the claims to a shop for manual adjudication. The payment system initiates payment to the health care provider using electronic funds transfer. The payment tracking system allows health care providers to monitor the payment status of a claim after submission.

27 Claims, 10 Drawing Sheets

OTHER PUBLICATIONS

Hagland, Mark Healtheon: Zigging and zagging to adjust to health care realities Health Management Technology; Atlanta; Jul. 1997 vol. 18, Issue 18, p30.

Llana, Jr. A. 'Conveying the Image', Feb. 1992, v12, n8, p22 (4). Gale Group computer DB [online] DG Review. Retrieved from: Dialog Accession No. 01513428.

'Octel unveils strategic roadmap for health care marketplace focus is on efficiency–enchancing applications global messaging' Mar. 1996, Gale Group Retrieved from: Dialog Accession No. 01354156.

* cited by examiner

ELECTRONIC CREATION, SUBMISSION, ADJUDICATION, AND PAYMENT OF HEALTH INSURANCE CLAIMS

BACKGROUND OF THE INVENTION

1. The Field of the Invention

The present invention relates to systems for creating and processing health insurance claims. More particularly, the present invention relates to automated health claims processing systems, wherein a health care provider may access information relating to patients, create and submit claims electronically, learn whether the claims are to be automatically or manually adjudicated, and receive automated electronic payment from the claims processing system.

2. Relevant Technology

The cost of health care continues to increase as the health care industry becomes more complex, specialized, and sophisticated. The proportion of the gross domestic product that is accounted for by health care is expected to gradually increase over the coming years as the population ages and new medical procedures become available. Over the years, the delivery of health care services has shifted from individual physicians to large managed health maintenance organizations. This shift reflects the growing number of medical, dental, and pharmaceutical specialists in a complex variety of health care options and programs. This complexity and specialization has created large administrative systems that coordinate the delivery of health care between health care providers, administrators, patients, payors, and insurers. The cost of supporting these administrative systems has increased during recent years, thereby contributing to today's costly health care system.

A significant portion of administrative costs is represented by the systems for reviewing and adjudicating health care provider payment requests. Such payment requests typically include bills for procedures performed and supplies given to patients. Careful review of payment requests minimizes fraud and unintentional errors and provides consistency of payment for the same treatment. However, systems for reviewing and adjudicating payment requests also represent transaction costs which directly reduce the efficiency of the health care system. Reducing the magnitude of transaction costs involved in reviewing and adjudicating payment requests would have the effect of reducing the rate of increase of health care costs. Moreover, streamlining payment request review and adjudication would also desirably increase the portion of the health care dollar that is spent on treatment rather than administration.

Several factors contribute to the traditionally high cost of health care administration, including the review and adjudication of payment requests. First, the volume of payment requests is very high. Large health management organizations may review tens of thousands of payment requests each day and tens of millions of requests yearly. In addition, the contractual obligations between parties are complex and may change frequently. Often, there are many different contractual arrangements between different patients, insurers, and health care providers. The amount of authorized payment may vary by the service or procedure, by the particular contractual arrangement with each health care provider, by the contractual arrangements between the insurer and the patient regarding the allocation of payment for treatment, and by what is considered consistent with current medical practice.

During recent years, the process of reviewing and adjudicating payment requests from health care providers has become increasingly automated. For example, there exist claims processing systems whereby technicians at health care providers' offices electronically create and submit medical insurance claims to a central processing system. The technicians include information identifying the physician, patient, medical service, insurer, and other data with the medical insurance claim. The central processing system verifies that the physician, patient, and insurer are participants in the claims processing systems. If so, the central processing system converts the medical insurance claim into the appropriate format of the specified insurer, and the claim is then forwarded to the insurer. Upon adjudication and approval of the insurance claims, the insurer initiates an electronic fluids transfer to the physician's account.

The foregoing example of an automated payment system reduces the amount of paperwork and time required to process insurance claims and receive payment for treatment provided to patients. However, a significant cost in processing insurance claims is the review and adjudication of individual claims. Careful review of payment requests minimizes fraud and unintentional errors and provides consistency of payment for the same treatment. Furthermore, adjudication of insurance claims ensures that the treatment for which payment is requested conforms to current medical practice and to the contractual obligations of the insurer with respect to the patient and health care provider. However, because manual review and adjudication of insurance claims is labor intensive, a large number of payment requests are simply paid to the requesting health care provider with minimal review.

There have been developed systems that partially automate the claims review and adjudication process. Under these systems, payment requests are accompanied by codified diagnostic and treatment summaries that describe the nature of the patient's condition and the treatment provided. For example, the medical services and procedures provided to the patient may be described using the codes and code modifiers of a volume entitled Physician's Current Procedural Terminology (CPT), which is maintained and updated annually by the American Medical Association.

When a central processing system receives codified payment requests, the system may either summarily approve the request for payment or may assign one or more review codes to the payment request, depending on the diagnosis and treatment. Review codes indicate that the payment request should be further analyzed for consistency with current medical practice or with the patient's condition before payment is authorized. Again, depending on the nature of the treatment, payment requests that are assigned review codes may be either further processed by the automated system or may be forwarded to a medical analyst for manual adjudication.

The foregoing systems at least partially automatically adjudicate insurance claims and have the advantages of reducing the labor intensive nature of the adjudication process and reducing the amount of time needed for claims processing. However, these systems fall short of reducing or eliminating many of the aspects of the claims processing procedure that require repeated or intensive human attention. For example, from the health care provider's standpoint, it is very difficult to routinely be aware of the medical treatments and services that are covered by each patient's insurance plan, since different patients often have widely different contractual arrangements with insurers and health care providers. Depending on the insurance plan of each patient, the patient's medical condition, the patient's treatment history, and other factors, certain treatments may or may not be subject to insurance coverage.

In the past, physicians or their staff have had to spend inordinate amounts of time investigating which treatments will be covered by various insurers and insurance plans. Without detailed investigation, payment request are often rejected in full or in part for being directed to treatments not covered by a patient's insurance plan. Furthermore, physicians are often not made aware of payment request denials until after the sometimes lengthy review and adjudication process is completed. Such delay and uncertainty frequently leads to inefficiencies in providing and selecting appropriate medical treatments and can lead to patient and health care provider frustration.

Another problem with current claims processing procedures is that health care providers are required to submit certain patient and treatment information with payment requests. This patient and treatment information may include the patient's medical history, medical condition, and the treatment provided to the patient, along with other information that identifies the patient and gives background information. Often, different insurers and insurance plans require different sets of patient and treatment information. Accordingly, health care providers have been required to investigate the range of information required with individual patients and their associated insurers and insurance plans. Otherwise, health care providers run the risk of submitting too little information to the insurer, with the result that the payment process is delayed as the claim is returned to the health care provider and the correct information is gathered and submitted. In other situations, time and effort is wasted as patients and health care providers provide more information than is required by particular insurers.

Another problem with current systems is that when a claim is submitted for processing, the health care provider has no indication of how the claim may be processed or how the claim may be adjudicated. For example, if a particular insurer uses a combination of automated and manual adjudication procedures, there is no way for a health care provider to tell if the claim will be adjudicated manually or automatically. Furthermore, there is no way for the health care provider to determine the likelihood that a claim will be paid. In addition, since the exact amount that is ultimately paid may depend on the adjudication status of the claim, it may be difficult for a health care provider to determine the value of claims when they are submitted. Finally, since the adjudication process may take an indefinite amount of time, it is difficult to identify when payment can be expected.

Conventional claims processing systems further do not allow health care providers to adequately monitor the status of an insurance claim during the processing thereof. For example, if a submitted insurance claim has not been paid in a timely fashion, the health care provider generally has no automated system for learning of the status of the submitted claim. Typically, the only options are to personally contact a representative of the claims processing system or to merely wait for eventual payment or rejection of the submitted claim.

In view of the foregoing, there is a need in the art for more fully automated claims processing systems. For example, it would be an advancement in the art to reduce the uncertainty as to whether a claim to be submitted is likely to be paid or rejected. Furthermore, it would be advantageous to provide a claims processing system that would more easily allow health care providers to know what patient and treatment information must accompany insurance claims. There also exists a need for systems that allow health care providers to easily learn of the status of submitted insurance claims.

SUMMARY OF THE INVENTION

The present invention relates to claims processing systems that allow health care providers to electronically submit insurance claims for payment. The claims processing systems utilize network or other remote communication between computer processors, thereby increasing efficiency and decreasing the costs and time that have been associated with conventional claims processing systems.

The claims processing systems include a benefits system which allows patient to access their medical benefits information on-line, and optionally to allow authorized individuals to modify either benefit information or insurance plans when desired. Furthermore, health care providers have access to patient benefits information in preparation for consulting with a patient. Optionally, the health care provider can access, download, or print a partially prepared claim or diagnosis form having much of the patient benefits information already included thereon. Partially prepared claims forms significantly reduce overall time, effort and cost that are required to ensure that accurate and complete patient and treatment information is submitted with the insurance claims, and that the claims conform to the requirements of the insurer.

An automated adjudication system is also included in the claims processing systems of the invention. One function of the automated adjudication system is to perform a precheck process on claims before submission. When a health care provider contemplates providing treatment to a patient and submitting a claim to the patient's insurer for payment, the precheck process may be used to determine whether the claim may be automatically adjudicated or must instead by manually adjudicated. For example, the precheck process involves comparing the diagnosis and the proposed or actual treatment against a benefits database that contains information relating to currently accepted medical practice, the contractual arrangements between the patient, the insurer, and the health care provider, and the patient's medical history. If the precheck process indicates that a claim based on the diagnosis and proposed treatment would be automatically adjudicated, the health care provider is informed of this result. If however, the proposed claim is consistent with fraud, unintentional error, or if for some other reason the insurer would subject the claim to a more thorough review, the health care provider is informed that manual adjudication is to be conducted. In response, the health care provider may choose to modify the content of the claim in an effort to obtain automated adjudication. Feedback from the precheck process may also provide information of the amount that will be paid for the claim.

The claims precheck process significantly increases the ease by which a health care provider may submit claims that conform to accepted medical practice, the preferences of the insurer, or other standards that allow expedited review and payment of claims. The precheck process decreases the costs that have been previously associated with investigation on the part of the health care provider as to the types of treatment that would be subject to automated review and adjudication. Furthermore, the precheck process allows the health care provider to gain a more complete understanding of the status and value of the claim prior to submission.

When the health care provider is satisfied with the status of the claim, it is submitted to the adjudication system, where it is either automatically adjudicated or forwarded to a claims shop for manual review and adjudication. A payment system included in the claims processing systems of the invention initiates payment for approved claims using electronic funds transfer. In the alternative, paper checks may be used to pay the health care provider.

The claims processing systems optionally include a payment tracking system that allows health care providers to monitor the payment status of submitted claims. For example, a health care provider may remotely log on to a central system and request information relating to the review, adjudication, and payment process with respect to a particular submitted claim or patient. In response to this request, the central system retrieves the requested information and transfers the information to the health care provider. The payment tracking systems of the invention provide significant advantages over the claims processing systems that have previously been used in the art. Under the invention, health care providers have greatly improved access to the payment status of claims during the review process.

The communications infrastructure of the claims processing system may advantageously comprise the Internet. For example, the claims precheck process, claims submission, payment status tracking, and other functions whereby remote computer processors interact may be performed via the Internet. Alternatively, other wide area networks or direct dial access may be used to support the communications infrastructure of the invention.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to claims processing systems that allow health care providers to electronically submit insurance claims for payment. The claims processing systems allow the health care provider to access the patient's benefits information relating to the contractual arrangement between the patient, the health care provider, and insurer. Before the health care provider submits the claims for payment and optionally before the treatment is performed on the patient, the claim may be pretested to determine whether the claim is to be automatically adjudicated or manually adjudicated. If the claim is to be automatically adjudicated, the health care provider may learn the amount that the insurer will pay for the treatment. If the pretesting indicates that manual adjudication will be necessary and the health care provider desires the certainty that automated adjudication affords, the treatment and the claim may be adjusted as needed in order to allow automatic adjudication.

The pretested claim is submitted to the claims processing system, and the claim is adjudicated according to the method that has been specified in the pretesting procedure. According to one embodiment of the invention, the health care provider may learn the payment status of the claim during the adjudication and payment process. Finally, electronic funds transfers are executed for insurance claims that have been adjudicated and approved.

In certain embodiments of the invention, the patient is also allowed to access the claims processing system in order to learn the scope of benefits provided under the patient's insurance plan. Furthermore, the patient may be allowed to request modification of the benefits and of the contractual arrangements with respect to the health care providers, the insurers, or other parties.

Figure 1:
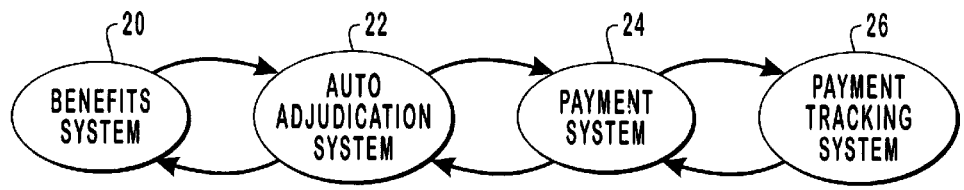
FIG. 1 is schematic diagram of primary subsystems of the claims processing systems of the invention.

Turning now to FIG. 1, the various subsystems of one embodiment of the claims processing systems of the invention are set forth. Benefits system 20 allows the health care provider to learn of the health care benefits associated with individual patients as the health care provider prepares for consultation with the patient. In addition, the benefits system may be accessible by the patients in order to inform the patients of the scope of their medical coverage. Finally, benefits system 20 is available to employers to provide benefit information to employees. One advantage of benefits system 20 is that it allows employees or other insured persons to directly access benefit information instead of requesting the information from a benefits office or other benefit administrator. This reduces the overall cost to provide a staff to answer questions about benefits, farther reducing administrative overhead.

Automated adjudication system 22 permits health care providers to electronically prepare insurance claims and submit the claims to the claims processing system. In one embodiment of the invention, the health care provider may use automated adjudication system 22 to determine, before submitting the claim, whether the claim is to be automatically adjudicated or manually adjudicated. Furthermore, the health care provider has the option to editing and the claim in order to allow automatic adjudication if desired.

Once an insurance claim has been adjudicated and approved, whether automatically or manually, a payment system 24 initiates a transfer of funds to the health care provider in response to the adjudicated insurance claim. In certain embodiments of the invention, the health care provider may access information regarding the adjudication status or the payment status of a submitted claim using payment tracking system 26. The function and structure of benefits system 20, automated adjudication system 22, payment system 24, and payment tracking system 26, and the manner in which these systems interact may be further understood by referring to FIGS. 2–9.

Figure 2:
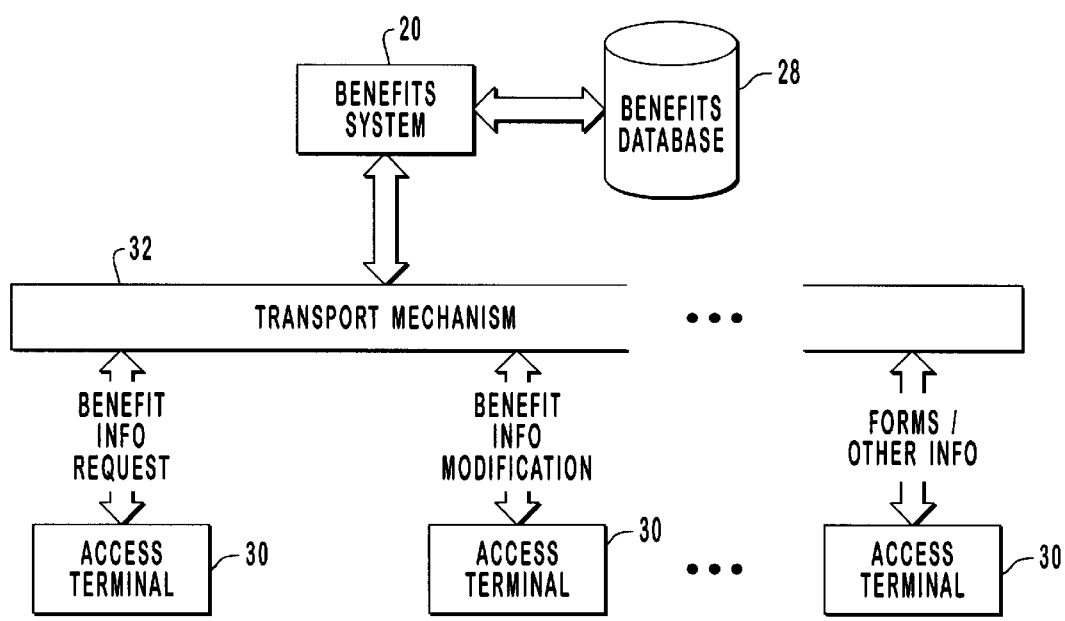
FIG. 2 is a schematic diagram illustrating an example of the communication infrastructure that allows health care providers, patients, and others to retrieve and submit claims and insurance benefits information.

The communications infrastructure whereby health care providers, patients, and others may access benefits information from the claims processing systems is illustrated in FIG. 2. Benefits system 20, which may include a central processor or a network server, is linked to patient and patient health benefits information contained in a benefits database 28. The information included in benefits database 28 may represent, for each participating patient, the contractual and insurance obligations between the patient, the insurers, and the participating health care providers. Such information may include, for example, the treatment covered by the patient's selected insurance plan, co-payments or other portions of medical expenses to be paid by the patient, running totals of periodic health care expenses actually paid by the patient, and the like. The periodic running totals of health care expenses paid by the patient may be provided, for example, because many insurance plans specify payment caps or the maximum amount that is to be paid by the patient as their portion of health care expenses during a calendar year or another period of time. Furthermore, any other patient or patient health care benefit information, such as medical history, persons to be contacted in case of emergency, and the like, may be contained in benefits database 28 as desired or needed. Accordingly, the combination of benefits system 20 and benefits database 28 represents one example of means for storing health benefit information.

In this embodiment, the claims processing system includes means for health care providers to access the health benefit information. Access terminals 30 are but one example of such means for accessing health benefit information. In particular, interactive access to benefit system 20 and benefits database 28 is provided via access terminals 30, which communicate with the benefits system in a network infrastructure. Transport mechanism 32 is used to transfer information between benefit system 20 and access terminals 30. Transport mechanism 32 may be the Internet, a dedicated wide area network, direct dial access using telephone lines, or any other communication system whereby remote computers may communicate with each other. In many cases, the use of the Internet as transport mechanism 32 and as the network infrastructure for supporting much of the other communications and data transfer functionality of the claims processing systems of the invention provides certain advantages. For example, taking advantage of the Internet eliminates the need to establish a dedicated wide area network. It can be understood that in cases wherein transport mechanism 32 is the Internet or another wide area network, access terminals 30 may be client terminals and benefits system 20 may include a network server or be installed on a network server.

Depending on the particular functions desired from benefits system 20, health care providers and patients may access various types of information using access terminals 30. For example, the health care provider or patient may make a request to benefits system 20 for health care benefits information. As but one example of such a request, a patient contemplating elective surgery could use the system depicted in FIG. 2 to learn whether his or her medical insurance covers the contemplated surgery. Likewise, the surgeon who will perform the operation may use access terminal 30 to determine the patient's scope of insurance coverage. Optionally, a patient or other authorized entity may modify the benefits package using access terminal 30. One example of modifying benefits is adding or removing a dependent who is authorized to receive health care under a patients medical insurance.

According to yet another feature of the benefits system of the invention, the health care provider optionally is allowed to download a diagnosis, treatment, or claim form that is already partially prepared with the patient's personal, medical, and/or benefits information. Accordingly, the health care provider may more efficiently prepare and submit claims for payment after treating the patient and may ensure that the information required by the insurer is included in the submitted claim in the appropriate format.

Figure 3:
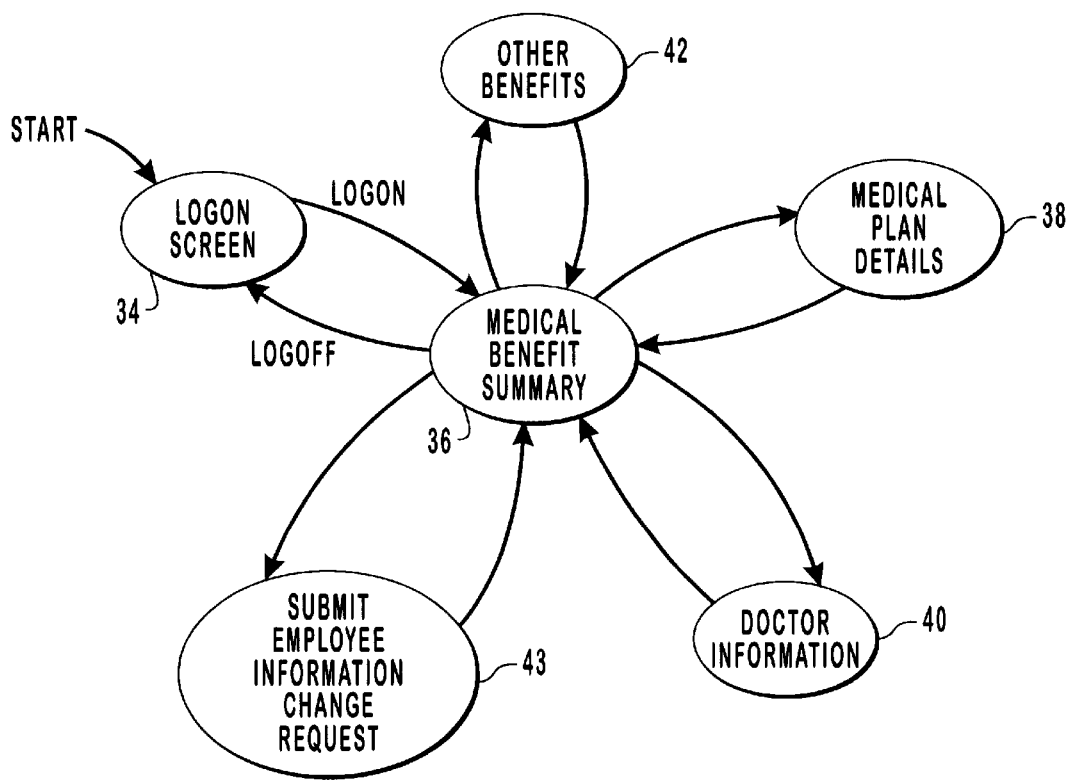
FIG. 3 diagrammatically illustrates selected choices available to a patient when the patient accesses the benefits information stored on the benefits system of FIG. 1.

Interaction between a health care provider or a patient using access terminal 30 and benefits system 20 may be facilitated by software executed on access terminal 30. Such software may generate a user interface, including computer-supportable forms, menu driven displays, or any other system whereby the patient or health care provider is allowed to initiate functions or access information as desired. As discussed below, the software on access terminal 30 may comprise an Internet browser if benefits system 20 is accessed via the Internet. FIG. 3 illustrates a representative example of the choices that may be made by a patient using access terminal 30 in order to access benefit information. Moreover, the choices depicted in FIG. 3 further illustrate one example of the means for accessing health benefit information. In this example, the patient begins at a logon screen 34 that prompts the user to enter a password or other information that identifies the patient as being authorized to use the system. Upon logging in, a medical benefits summary 36 is displayed to the patient. For example, the medical benefit summary 36 provides a brief overview of the patient's health benefits and instructions for accessing more detailed information.

In this example, medical plan details 38, including more detailed explanations of health benefits, more complete contractual provisions, or the like, may be selected and viewed by the patient. The user interface in this example also permits the patient to access doctor information 40, which may include a list of doctors participating in the patient's medical plan, educational and practice information relating to the doctors and any other desired information. In addition, other employee or insurance benefits 42 are optionally accessible through the user interface provided on access terminal 30, examples of which include disability insurance provisions, life insurance, and the like. Furthermore, in this example, the patient has access to a computer supportable form 43 whereby a request for plan enrollment, eligibility modification, or a change in any other employee information may be submitted. Accordingly, patients may request updates to their medical plan as has been described herein.

Figure 4:
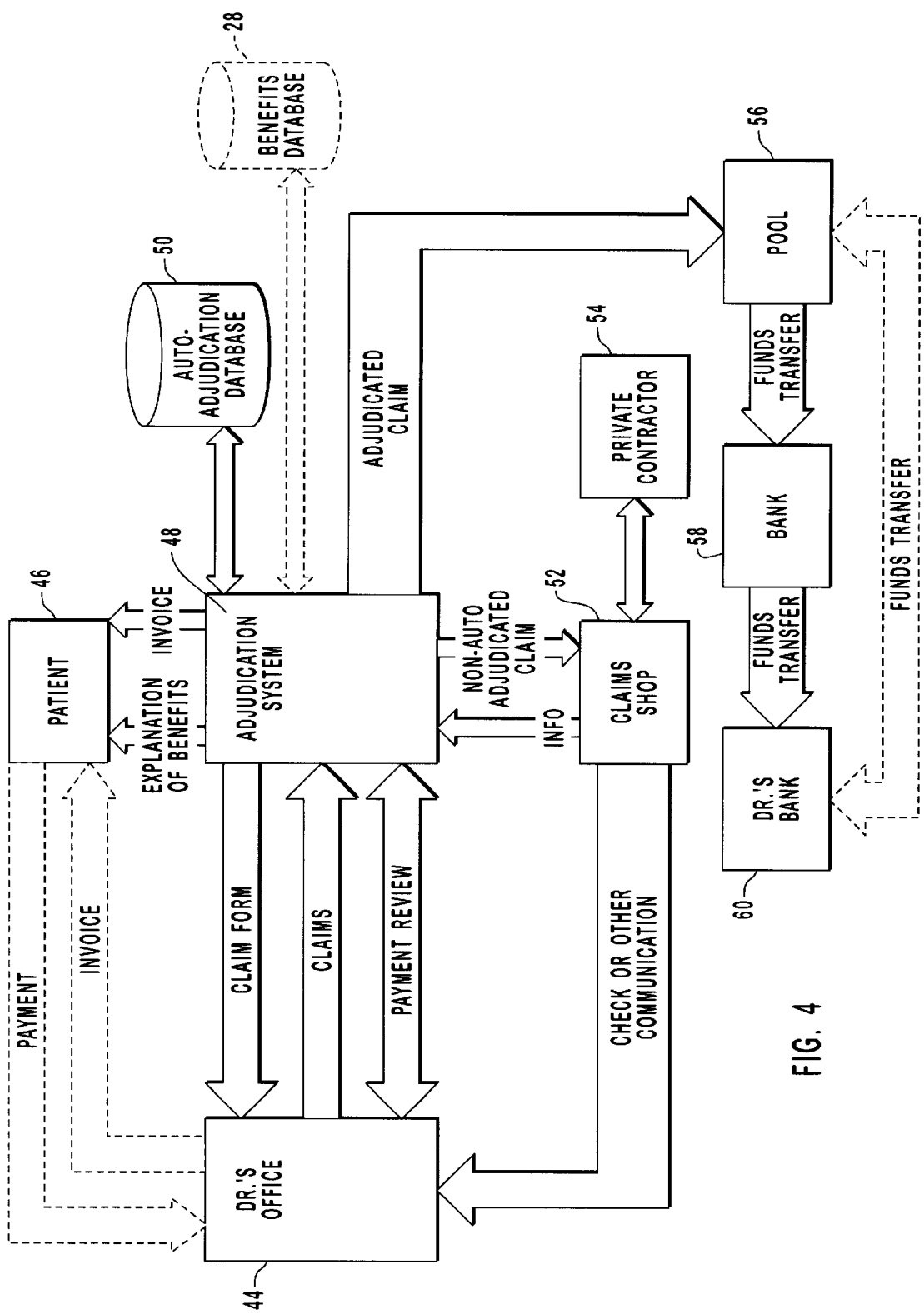
FIG. 4 is a schematic diagram illustrating in greater detail the elements of the auto-adjudication system and the payment system of FIG. 1.

The elements and functions of auto adjudication system 22 and payment system 24 of FIG. 1 are disclosed in greater detail in FIG. 4. In particular, FIG. 4 illustrates, for purposes of example and not limitation, a procedure whereby a health care provider prepares and submits a claim for payment, after which the claims processing system of the invention adjudicates the claim and initiates payment on the claim if approved. The procedure according to this embodiment begins as an employee in doctor's office 44 requests and receives a claim form from the claims processing system according to the methods that have been described herein. Once the claim form has been received, the health care provider at the doctor's office 44 provides treatment to a patient 46. The diagnosis and treatment are encoded onto the claim form as the claim is prepared for submission. According to one embodiment of the invention that will be described in greater detail hereinafter, the doctor may pretest the claim before submission in order to determine whether the claim is to be automatically adjudicated or manually adjudicated.

Creation of the claim may be accomplished using access terminals 30, or other suitable input devices at doctor's office 44. Thus, access terminals 30, and suitable software executed thereon, are examples of means for a health care provider to enter a claim. The claim is then transferred to adjudication system 48, typically using the network infrastructure, such as the Internet, that supports the claims processing systems of the invention. Accordingly, one example of means for submitting the claim for payment includes the combination of access terminal 30 or another suitable input device and the Internet or another network infrastructure for communicating with adjudication system 48.

Claims that have been determined to be automatically adjudicable, based on criteria set by the insurer, are compared against an auto adjudication database 50. A predefined set of adjudication rules are contained in auto adjudication database 50 and provide criteria by which claims are either approved or denied. Claims that relate to procedures requiring manual adjudication are transferred to a claims shop 52 where the claims are reviewed and analyzed by claims processing technicians. For example, claims shop 52 may be similar to conventional claims shops that have been used in the art to adjudicate medical insurance claims. Frequently, insurers employ private contractors 54 to review all or only certain classes of manually adjudicate claims in an effort to reduce administrative costs and increase the effectiveness of the claims review process.

Adjudication system 48 may be used to determine the adjudication status of the submitted claim, or in other words, if a submitted claim is compatible with automatic adjudication, or whether it must be manually adjudicated instead. As will be described herein in greater detail, a preliminary determination of the adjudication status of a claim may be performed before the claim is submitted. The claims processing systems of the invention may include means for sending claims submitted for payment to an entity for manual adjudication. One example of such means includes adjudication system 48 and any suitable communications pathway. Adjudication system 48 may communicate with claims shop 52 via the Internet or another wide area network. In the alternative, paper copies of submitted claims may be delivered to claims shop 52 through the mail or otherwise.

Returning now to the automated adjudication system, a claim that has been automatically adjudicated and approved is forwarded from adjudication system 48 to means for initiating payment of an adjudicated claim. One example of such means is pool 56, which may be a health care expense account established by a third party insurer or by a self insuring corporation. Funds in an amount equal to the payment approved by adjudication system 48 may then be transferred from pool 56 to a clearinghouse bank 58, after which the funds are transferred to the doctor's account 60. Alternatively, funds may be transferred directly from pool 56 to doctor's bank 60.

Payment may be advantageously conducted through electronic transfer of funds, which reduces the time and expenses involved in preparing paper checks and other methods of initiating payment. Accordingly, the claims processing system may further include means for initiating electronic transfer of funds. For example, such means may be any system for electronically requesting and initiating payment between pool 56 and bank 60. Systems for making electronic transfer of funds are well known in the banking art.

When an insurer is obligated to pay only a portion of the payment requested in an approved claim, an invoice may be sent from adjudication system 48 to patient 46 requesting that the patient pay the remaining portion. One method for sending an invoice involves means for printing a paper invoice to be sent through the mail. Such means may be included in adjudication system 48, and may comprise computer-executable programs and associated printers, many of which are well-known in the art. Regardless of whether the insurer pays all or only part of an approved claim, the claims processing system may include means for sending an explanation of benefits to the patient. Such means may likewise be included in adjudication system 48 and comprise computer-executable programs and associated printers, many of which are well-known in the art. The explanation of benefits typically informs the patient of the status of the claim, the treatment for which payment has been requested, the amount to be paid by the insurer and the patient, or any other relevant information.

Returning now to the manual processing of claims, when claims shop 52 or private contractor 54 either approves or denies payment of a claim, one of various methods may be used to make the payment or communicate the rejected status of the claim to doctor's office 44. In one alternative, a check or a notice of rejection is mailed or otherwise delivered from claims shop 52 to doctor's office 44. Alternatively, or in addition, information is transferred from claims shop 52 to adjudication system 48 in order to initiate automatic payment for the claim using pool 56 and electronic funds transfer. Furthermore, if a patient is required to pay all or part of the payment requested by a claim, an invoice may be forwarded to patient 46 from adjudication system 48 or from doctor's office 44.

Figure 5:
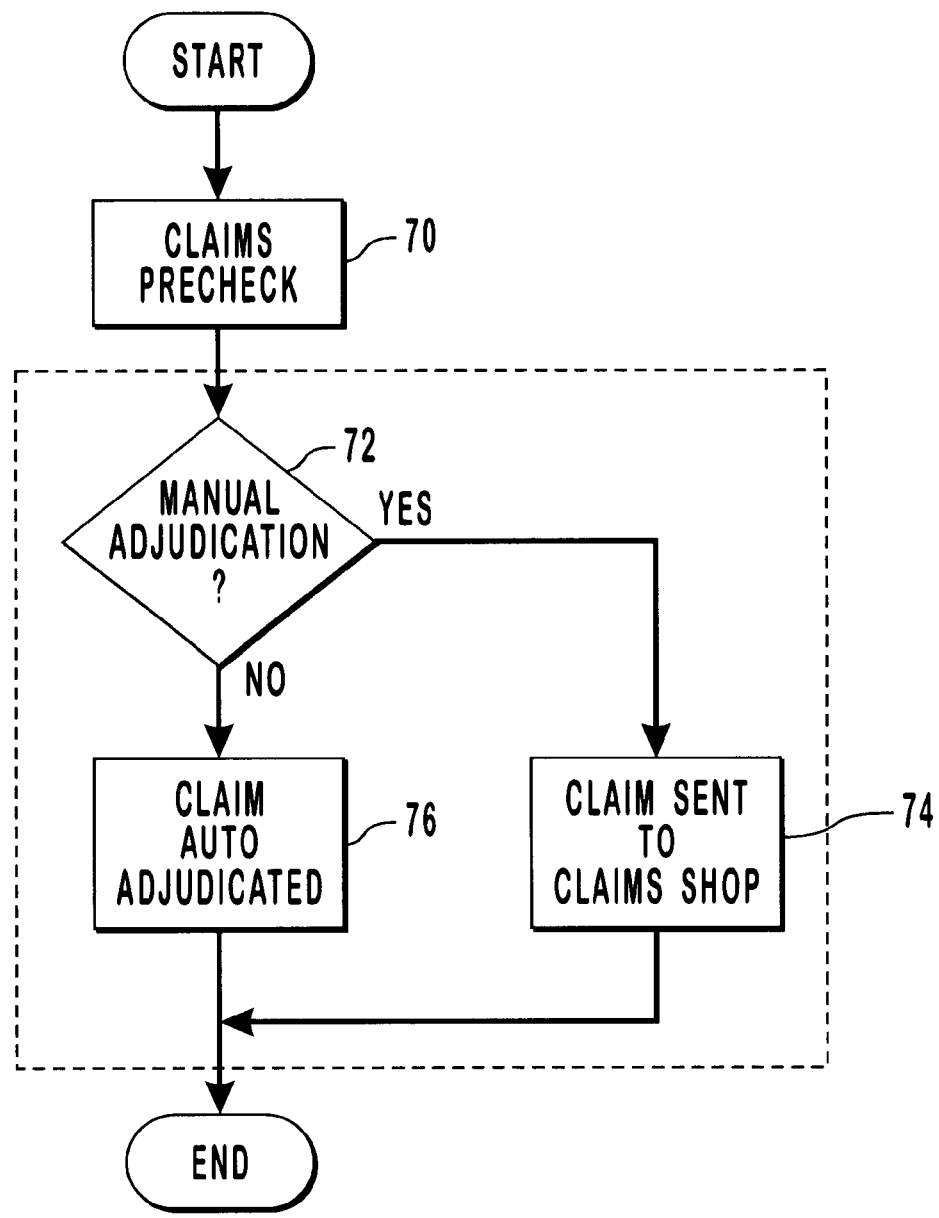
FIG. 5 is a flow diagram broadly showing a method whereby claims are submitted for either automated adjudication or manual adjudication.

FIG. 5 broadly describes, in flow chart form, a method of preparing and submitting claims and adjudicating, either automatically or manually, the submitted claim. In step 70, the health care provider has prepared a proposed or actual claim based on treatment that is contemplated or has already been performed. The claim is then prechecked according to methods for determining whether the claim may be automatically adjudicated or must instead be manually adjudicated. One example of a claims prechecking process is described in detail herein in reference to FIG. 6. Once the claim is finalized and has been prepared for submission, the decision whether to manually or automatically adjudicate is made in step 72. If the diagnosis and treatment or other factors described in the submitted claim require manual adjudication, the submitted claim is sent to the claims shop (step 74) where the claim is reviewed by a adjudicator. Typically, manually adjudicated claims are reviewed according to conventional standards based on current methods of medical practice and the contractual relationship between patient, health care provider, and the insurer. If the submitted claim is instead compatible with auto adjudication, the claim is automatically reviewed according to the methods disclosed herein in step 76.

Figure 6:
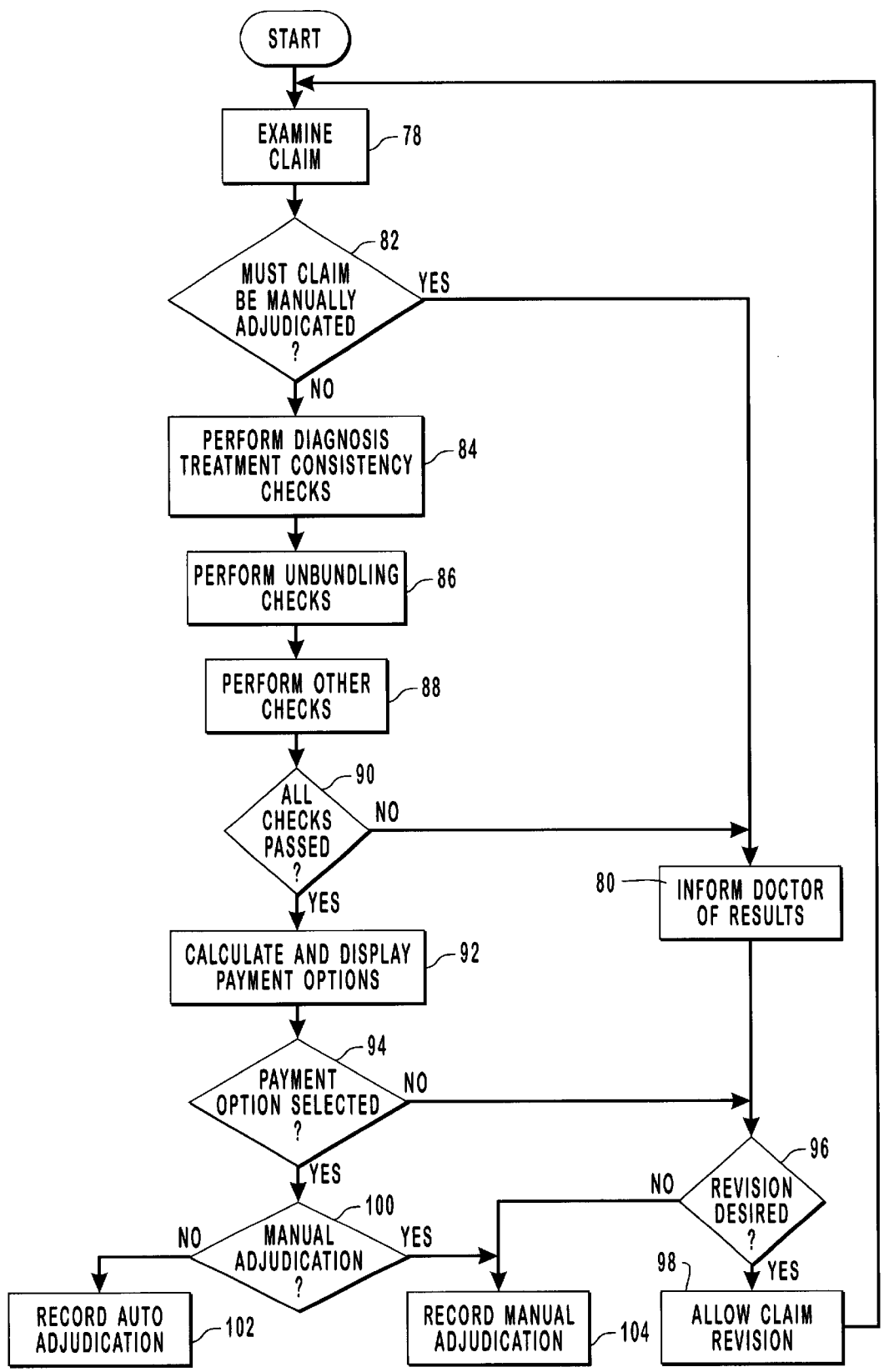
FIG. 6 is a flow diagram depicting a method whereby a health care provider may learn, prior to submission of a claim, whether the claim is to be automatically adjudicated or manually adjudicated.

Step 70 of FIG. 5, wherein a claims precheck is performed on a claim before submission is described in further detail in FIG. 6. Allowing a health care provider to precheck the adjudication status of a claim before submission, or in other words, whether the claim is compatible with auto adjudication or instead must be manually adjudicated, increases the certainty of the health care provider that the submitted claim will be approved. Furthermore, checking the adjudication status of claims encourages health care providers to provide treatment that conforms with current medical practices and that is preferred by the insurer. In particular, prechecking a claim before submission allows a health care provider to be relatively certain that the claim will be approved and paid, which strengthens the incentives of the health care provider to provide preferred treatment. Furthermore, some insurers may find it advantageous to provide incentives to encourage submission of automatically adjudicable claims, such as compensating automatically adjudicated claims at a higher rate than manually adjudicated claims. Furthermore, when auto adjudication is coupled with automated payment, health care providers may be able to receive funds within a few days of submission rather than the traditional 60 to 90 days. This may be a great incentive for health care providers to submit claims that can be autoadjudicated, even if no other incentives are provided. The claims processing system of the invention facilitates submission of automatically adjudicated claims, and such automatic adjudication is often preferred by health care providers.

As is the case with many of the other communication features of the present invention, the claim precheck process illustrated in FIG. 6 may be advantageously conducted through the Internet or over another wide area network. In a first step 78, the proposed claim is examined in order to determine whether the claim must be manually adjudicated. Various factors may be taken into account in determining the adjudication status of a claim, including but not limited to the type of treatment for which compensation is sought, the particular health care provider submitting the claim, the dollar amount of the claim, the medical history of the patient, and so forth.

Basically, steps 78 and 82 allow any criteria to be established by the insurer for claims that must be manually adjudicated. The types of treatments and claims that must be manually adjudicated often vary from insurer to insurer, and ordinarily depend on factors such as the contractual provisions between the insurer, the patient, and the health care provider, and currently acceptable medical practice. For example, an insurer may find it cost effective to manually review and adjudicate all claims relating to certain classes of diagnosis and treatment. For instance, relatively costly or uncommon procedures may always be subject to manual review and adjudication. Other insurers may allow auto adjudication for any type of claim.

When the treatment described in the claim indicates that manual adjudication is required, the doctor is informed of this fact in step 80 before the claim is submitted, and perhaps before the treatment has been recommended or carried out. If, in step 82, the claims processing system determines that the treatment does not necessarily require manual adjudication, the proposed claim may be subjected to one or more additional checks. This additional analysis of proposed claims generally is used to reduce the likelihood of fraud or unintentional errors in the submitted claims. In step 84, the proposed claim is compared against a database or another system to determine whether the diagnosis and treatment are consistent according to currently accepted medical practice. For example, a proposed claim will likely not be automatically adjudicated if the diagnosis is a sprained ankle and the health care provider responds with antibiotics treatment.

Another optional test for prechecking proposed claims includes performing an unbundling check in step 86. Unbundling checks are designed to uncover potentially fraudulent claim submissions. The practice of "unbundling" consists of performing, for example, multiple medical procedures on a patient through a single surgical incision while submitting an insurance claim for the multiple medical procedures as if they had been performed separately. Typically, when only one incision is required to perform multiple medical procedures, the payment to the operating physician is less than the payment would be if each of the multiple medical procedures had been conducted through separate incisions. Other fraudulent unbundling techniques for submitting claims on multiple medical procedures are sometimes used as well. Accordingly, step 86 involves analyzing the claim to determine whether the treatment described in the claim is consistent with an unbundling reporting practice, in which case, manual adjudication may be required. Furthermore, any other checks may be conducted on the proposed claim in step 88.

If, in step 90, the proposed claim has failed one of the forgoing additional checks, the doctor is informed of this result in step 80. Depending on the problem identified by the additional checks in steps 84, 86, and 88, the doctor may be informed either that the proposed claim will be subject to manual adjudication or that it is likely to be denied.

If the proposed claim has instead passed all the additional checks, the payment options available to the health care provider are calculated and displayed. For example, the health care provider may be informed that if payment is received electronically, then a different amount will be paid than if payment is received through a check or other mechanism. According to one embodiment of the invention, the amount that will be paid to the health care provider through various payment option is displayed in step 92. Payment options are separate and distinct from adjudication method. For example, a health care provider may elect to have manually adjudicated claims paid automatically. The amount paid to the health care provider may be dependent on the type of adjudication used as well as the payment option selected.

If the health care provider is satisfied with the payment option that has been calculated and displayed and agrees to the payment option in step 94, the process of prechecking the proposed claim has been completed, and the claim is in condition for submission. On the other hand, if the health care provider does not accept or agree to the payment options that have been calculated and displayed, the health care provider may choose to revise the proposed claim in step 96 in an attempt to make the claim compatible with automated adjudication or to achieve the desired compensation for services rendered.

As shown in FIG. 6, step 96 may be conducted after the health care provider has been notified that the claim must be manually adjudicated, that the claim has not passed the additional checks, or after the calculated and displayed payment option has not been selected. In step 98, the health care provider revises the proposed treatment or corrects any errors that have occurred in creating the proposed claim.

Such revision is accomplished using means for modifying the claim. Access terminals such as terminals 30 of FIG. 2 or any other computer running appropriate software are examples of such means for modifying the claim. In particular, access terminals 30 may support software that allows the health care provider to revise the content of a proposed claim before the claim is submitted for payment. Claim revision might result in the health care provider using a less costly, alternative treatment or a treatment that conforms to currently accepted medical practice or to the insurer's preferences. Once a claim has been revised, the newly proposed claim may be again subjected to the claim precheck method described herein.

Returning now to step 94, if the calculated and displayed payment option is selected by the health care provider, the proposed claim is submitted to the claims processing system of the invention for either auto adjudication in step 102 or manual adjudication in step 104. Moreover, if the health care provider is presented with the option of revising the proposed claim in step 96 but declines to do so, the proposed claim may then be manually adjudicated according to step 104.

Figure 7:
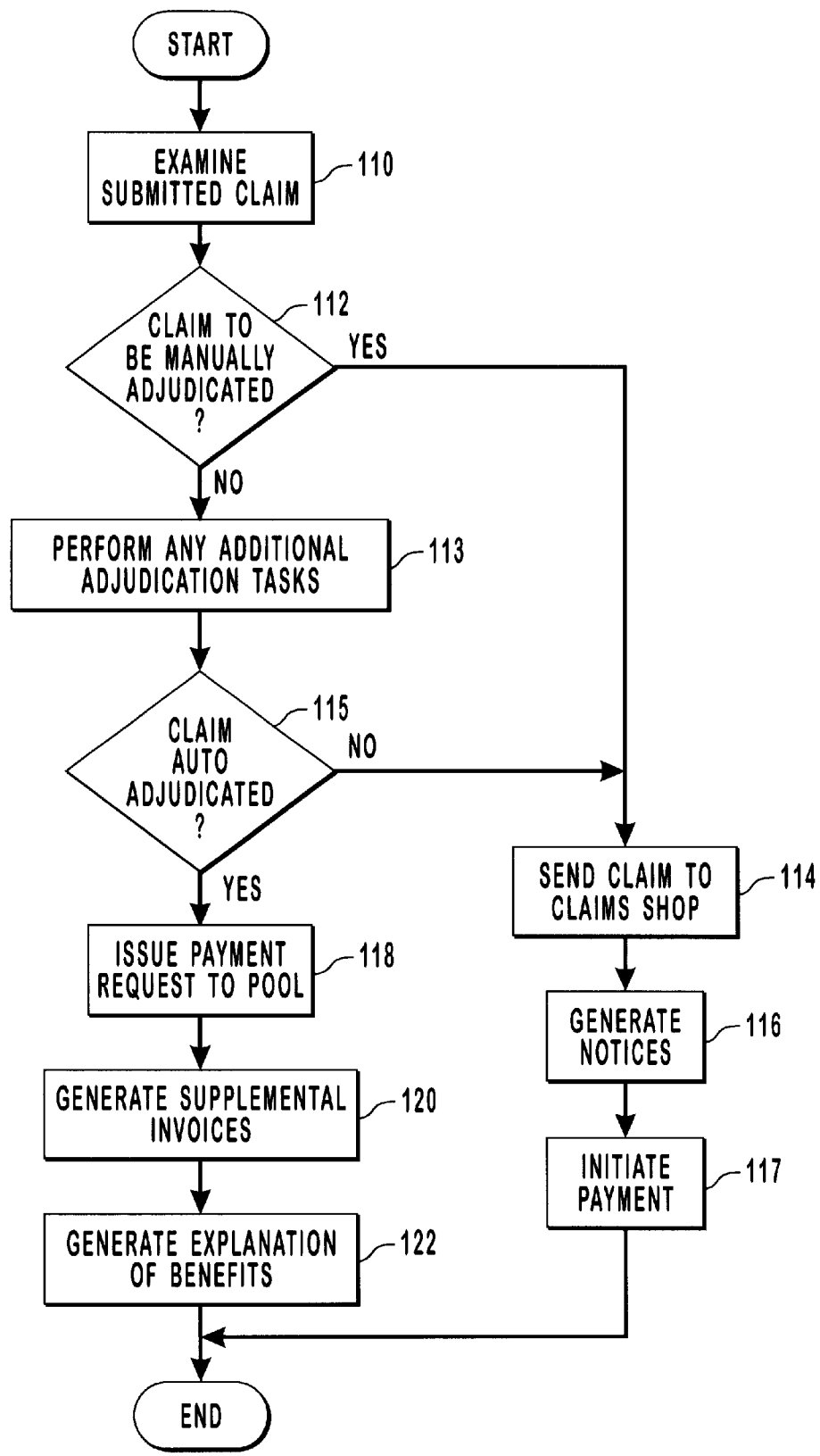
FIG. 7 is a flow diagram illustrating selected steps in a method for making payment of submitted claims using the payment system of FIG. 1.

The payment system 24 illustrated in FIG. 1 and described in reference to FIG. 4 is disclosed in greater detail in FIG. 7. The payment system and the method associated therewith are used after the claim has been submitted to the claims processing system by the health care provider. First, the submitted claim is examined in order to determine whether it is to be manually adjudicated or automatically adjudicated. If the submitted claim had previously been subjected to a claims precheck process as disclosed herein in reference to FIGS. 5 and 6, the decision to be manually adjudicate or automatically adjudicate the claim may have already been made. However, if the claim was submitted without making a preliminary decision between manual and automatic adjudication, steps 110 and 112 may include procedures substantially similar to steps 78, 82, 84, 86, 88, and 90 of FIG. 6.

If, according to step 112, a submitted claim is to be manually adjudicated, the claim is sent to claim shop 52 (step 114). After manual adjudication, notices are generated in step 116 and are forwarded to the patient, the insurer, the doctor, or other parties as desired. In addition, in some embodiments information regarding claim disposition, payment status, or other information, may be sent back to adjudication system 48 of FIG. 4 so that the information can be accessed by the health care provider or other appropriate individuals. Moreover, payment may be made at this stage if the manually adjudicated claim is approved. This is illustrated by step 117 of FIG. 7. Payment may be via electronic funds transfer or any other appropriate mechanism.

In the case of an automatically adjudicated claim, execution proceeds to step 113 where any auto-adjudication tasks in addition to those already discussed in conjunction with FIG. 6 are performed. These tasks may include any type of task necessary to complete the auto-adjudication process. Decision block 115 tests whether, after performing the tasks, the claim can still be autoadjudicated. If not, the claim may be submitted for manual adjudication as illustrated by step 114. If the claim is adjudicated, then execution proceeds to step 118 where adjudication system 48 issues a payment request to pool 56, thereby initiating payment to the health care provider. Note that step 113 and decision block 115 are optional and are only necessary if any remaining tasks for auto-adjudication remain after the precheck of FIG. 6. If the insurer pays only a portion of the amount requested in the approved claim, the payment system may generate supplemental invoices in step 120 that are directed to the patient or to another payor who will supply the remaining portion. Furthermore, an explanation of benefits may be generated in step 122 in order to inform the patient or other entity or individual of the status of the claim and the treatment for which the claim was submitted.

Figure 8:
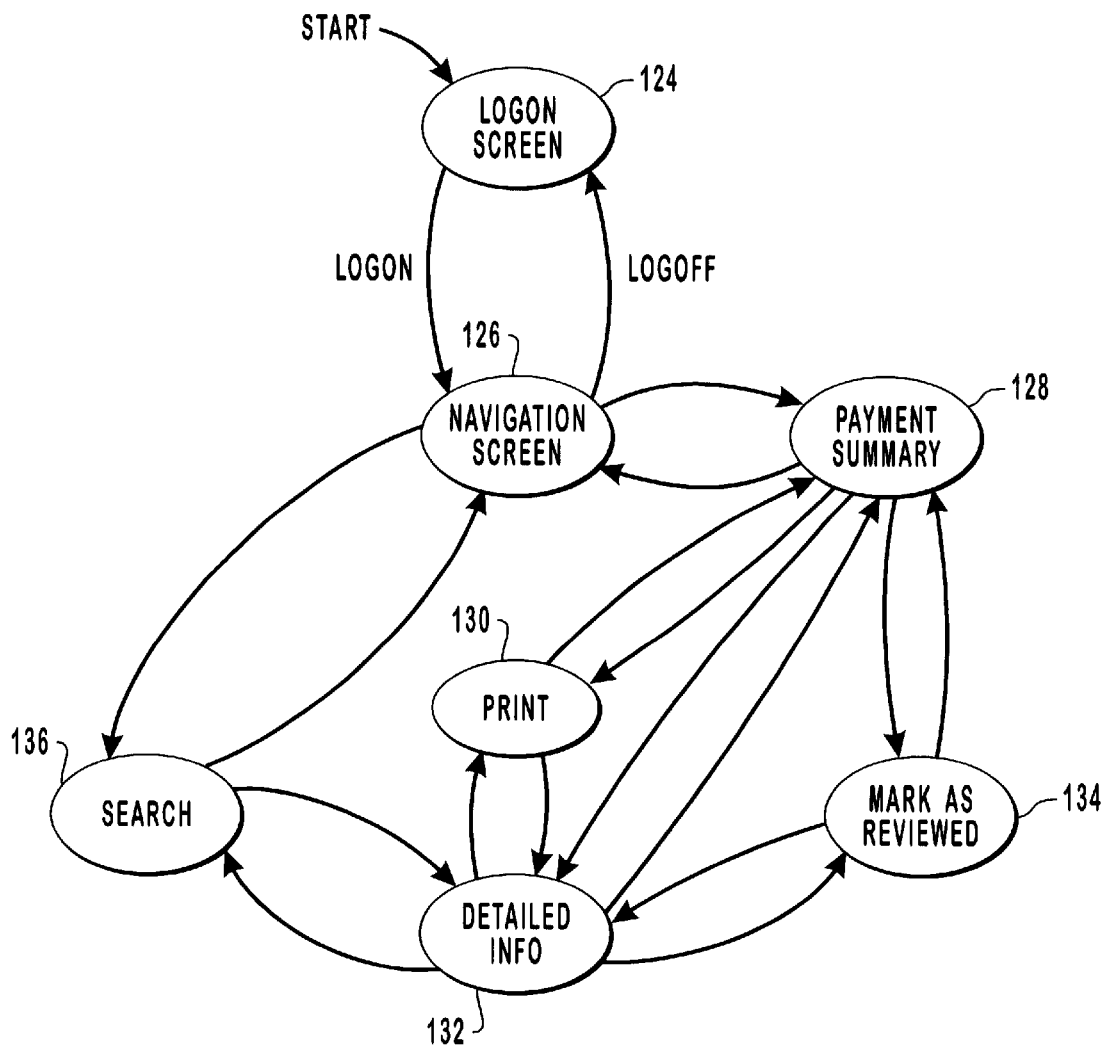
FIG. 8 diagrammatically illustrates selected choices available to a health care provider for tracking the payment status of a submitted claim using the payment tracking system of FIG. 1.

In embodiments of the invention that include payment tracking system 26 illustrated in FIG. 1, the health care provider may monitor the payment status of the submitted claim. According to one implementation, access terminals 30 of FIG. 2 or other appropriately configured computer may be further used to access payment information. Moreover, software may be provided on access terminals 30 for permitting the health care providers to access the desired payment information. As discussed below, such software may comprise a web browser if the payment system is accessed via the Internet. Such software will typically connect to another system, such as central system 140 of FIG. 9 discussed below, to perform the functions of the payment tracking system. Thus, in some embodiments a traditional client/server architecture may be used. FIG. 8 depicts selected choices presented to the health care provider by a representative example of the payment tracking system and the user interface generated thereby.

In this example, the health care provider is presented with a logon screen 124 that may request a password or other information that identifies the health care provider as being authorized to access the payment tracking system. Upon logging on, a navigation screen 126 that presents various menu options is displayed. From there, the health care provider may proceed to a payment summary 128 of a particular patient or submitted claim. From payment summary 128, a printed copy 130 may be generated, detailed information 132 may be acquired, or the health care provider may mark the particular submitted claim as having been reviewed at reference number 134. In addition, navigation screen 126 may lead to a search protocol 136 whereby the health care provider may locate information relating to a particular patient, submitted claim, or the like. The payment tracking systems of the invention are not limited to the specific system described above, but instead may comprise any system that allows health care providers to retrieve payment status and other payment information during the claim adjudication and payment process.

Figure 9:
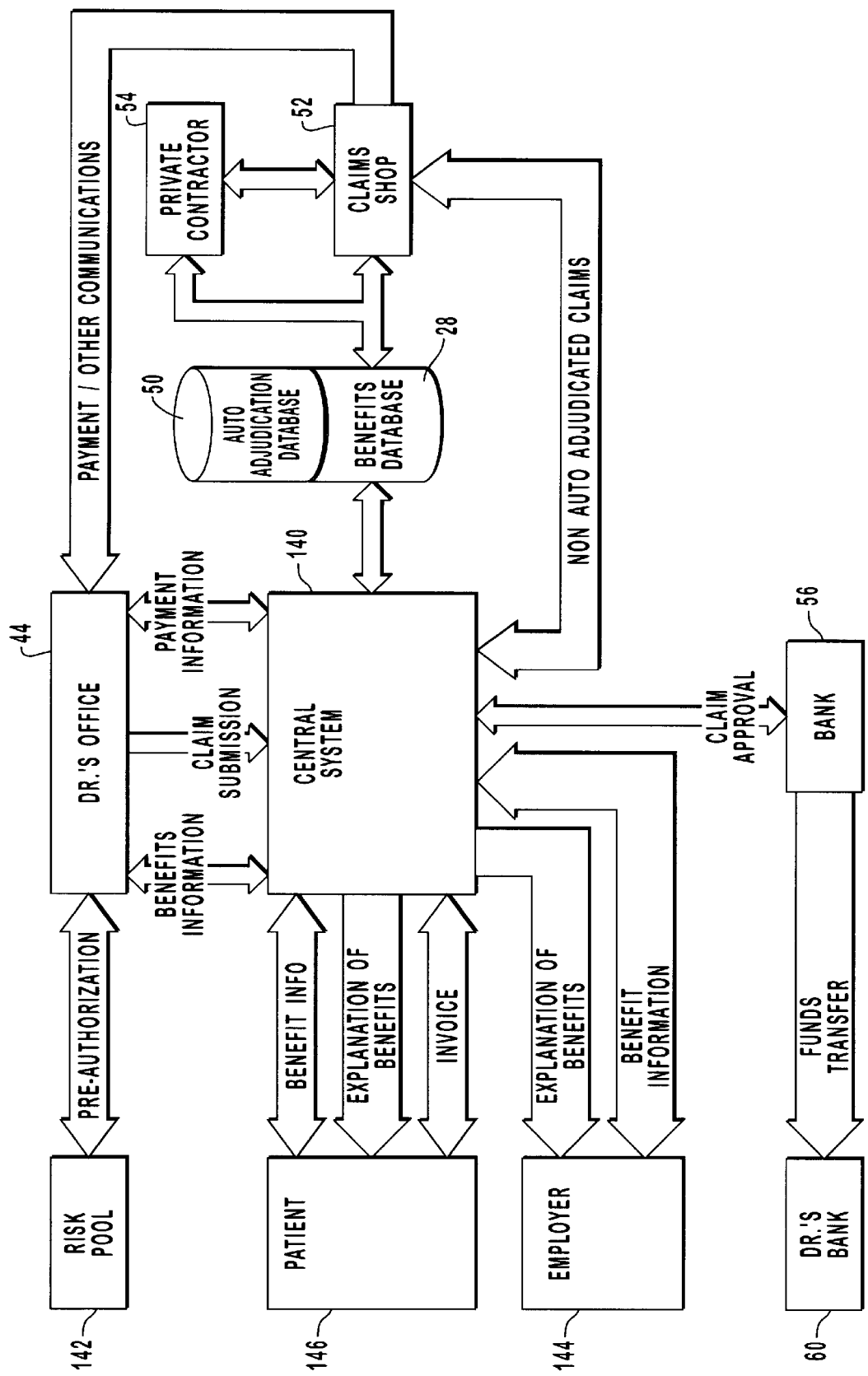
FIG. 9 is a schematic diagram of one example of a claims processing system of the invention incorporating a benefits system, an auto adjudication system, a payment system, and a payment tracking system.

FIG. 9 illustrates a further embodiment of the claims processing system of the invention that incorporates the benefits system 20, automated adjudication system 22, payment system 24, and payment tracking system 26 of FIG. 1. According to this embodiment, a health care provider at doctor's office 44 may request and receive benefits information from central system 140 in preparation for diagnosing and treating patient 46. The health care provider may learn, for example, that preauthorization is required prior to treatment. The preauthorization may be obtained, for example, from risk pool 142 as indicated. Furthermore, before or after treatment, the health care provider may receive an indication that the claim can be submitted for automated adjudication or may instead learn that the claim is to be manually adjudicated as has been described herein in reference to FIGS. 5 and 6. For example, the proposed claim may utilize auto-adjudication database 50 to identify diagnosis and treatments that may indicate fraud, error, or that may otherwise require manual adjudication.

The structure that corresponds to the means for a health care provider to determine the adjudication status of a claim prior to submission may include any of a number of elements that have been disclosed herein. For example, the means for determining the adjudication status may include a properly configured computer in combination with a network infrastructure and the adjudication system 48 of FIG. 4.

Once the health care provider has selected a treatment, perhaps by adjusting the treatment in response to the claims prechecking procedure, the claim is submitted to central system 140. In addition, the health care provider at doctor's office 44 may later access payment status of the submitted claim during the review and adjudication process.

According to this embodiment, patient 46 has access to benefits information from central system 140. For example, the manner of accessing benefit information may be substantially similar to that described in reference to FIGS. 2 and 3. After a claim has been submitted and adjudicated, an explanation of benefits may be forwarded by central system 140 to patient 46. In addition, if the submitted claim is denied or if the insurer pays only a portion of an approved claim, an invoice may be forwarded from central system 40 to patient 46, requesting payment of the remaining portion of the medical expense.

Employer 144 likewise has access to benefit information stored on central system 140 and in benefits database 28 according to this embodiment. The benefit information stored in benefits database 28 may be updated or modified by employer 144 as described herein in reference to FIGS. 2 and 3.

According to the embodiment of FIG. 9, when a claim is submitted to central system 140 and the claim is determined to be incompatible with auto adjudication, the submitted claim is forwarded to claims shop 52 or, in the alternative, to private contractor 54. If the manually adjudicated claim is approved, claims shop 52 sends full or partial payment to doctor's office 44, to doctor's bank 60, or to any other selected location. Payment may be electronic paper check, or any other appropriate method. Furthermore, when a submitted claim has been either approved or rejected using manual adjudication, communications may be directed to the health care provider describing the result.

Automatically adjudicable claims may be reviewed using a processor located in central system 140 according to the methods that have been described herein. Upon approval of an automatically adjudicated or manually adjudicated claim, notice of the approval may be sent from central system 140 to bank 56 in order to initiate payment of funds equal to the full or the partial amount requested.

Utilization of the Internet as a communications transport mechanism for the present invention has several distinct advantages. First, it eliminates the need to develop or maintain a dedicated network for the system. It also simplifies deployment and maintenance of client software. For example, the benefits system of FIGS. 2 and 3 and the payment tracking system of FIG. 8 may utilize Internet browser technology for the client portions of the software. Central system 140 or another appropriately configured server may provide the information using standard Internet protocols. This architecture may also be used in an intranet where one or more of the communication transport paths are over a local area network.

The present invention has several other benefits. For example, since claims are placed in an electronic form by Dr.'s Office 44, when the claim is initially submitted, the claim may be transferred and processed electronically after that point. Thus, even claims that are forwarded to claims shop 52 for manual adjudication may be transferred, forwarded, and reviewed in an electronic format. Thus, the internal workings of claim shop 52 may be completely or substantially "paperless" thus reducing the administrative overhead and reducing the time from submission to adjudication. Since claims are electronic, it is easier to split off claims to be transferred to private contractor 54 for processing. The decisions as to which claims and the actual sending may be a mostly or wholly automated task.

Figure 10:
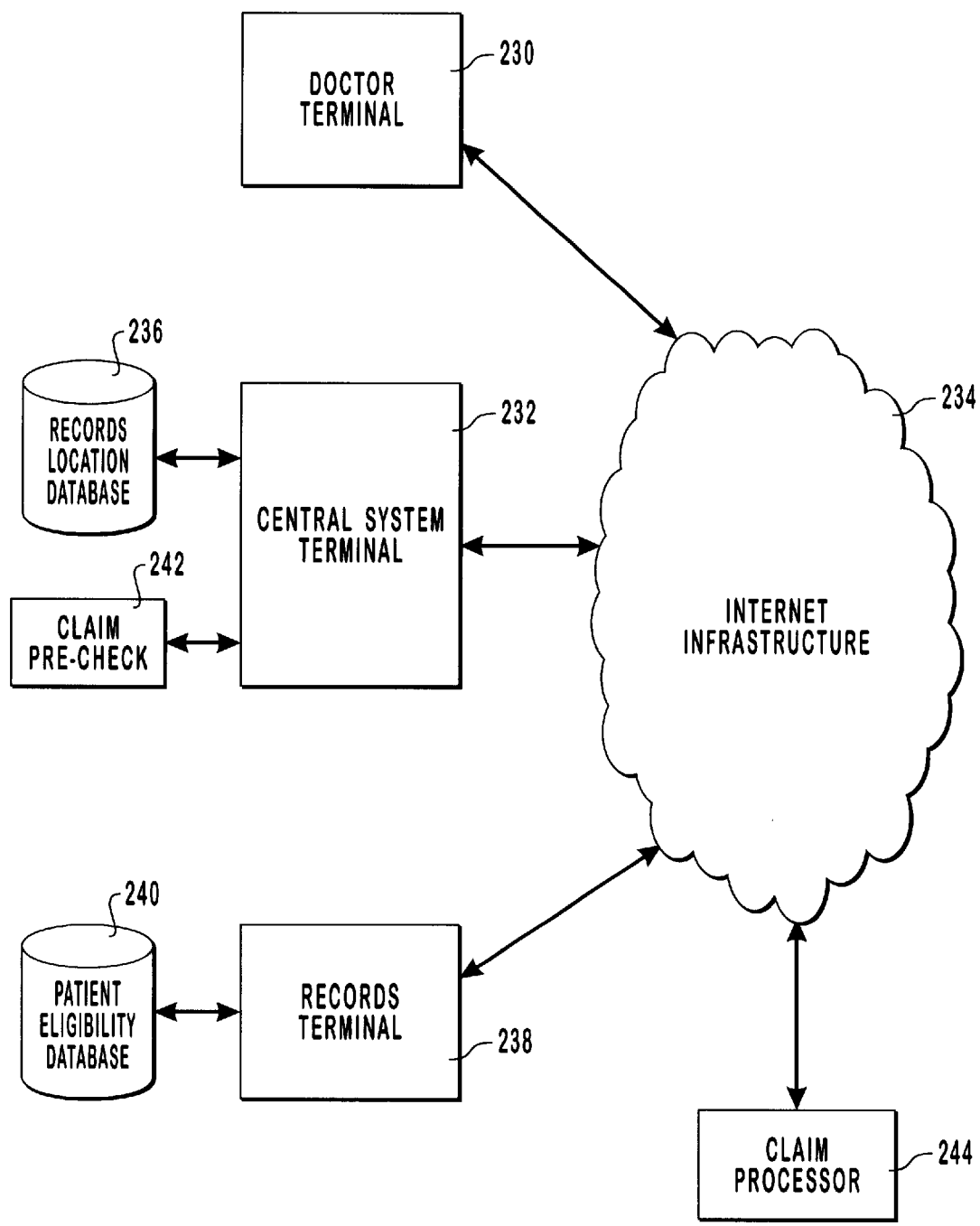
FIG. 10 is a schematic diagram of another example of a claims processing system of the invention, wherein the claims are submitted for prechecking and payment over the Internet.
Figure 11:
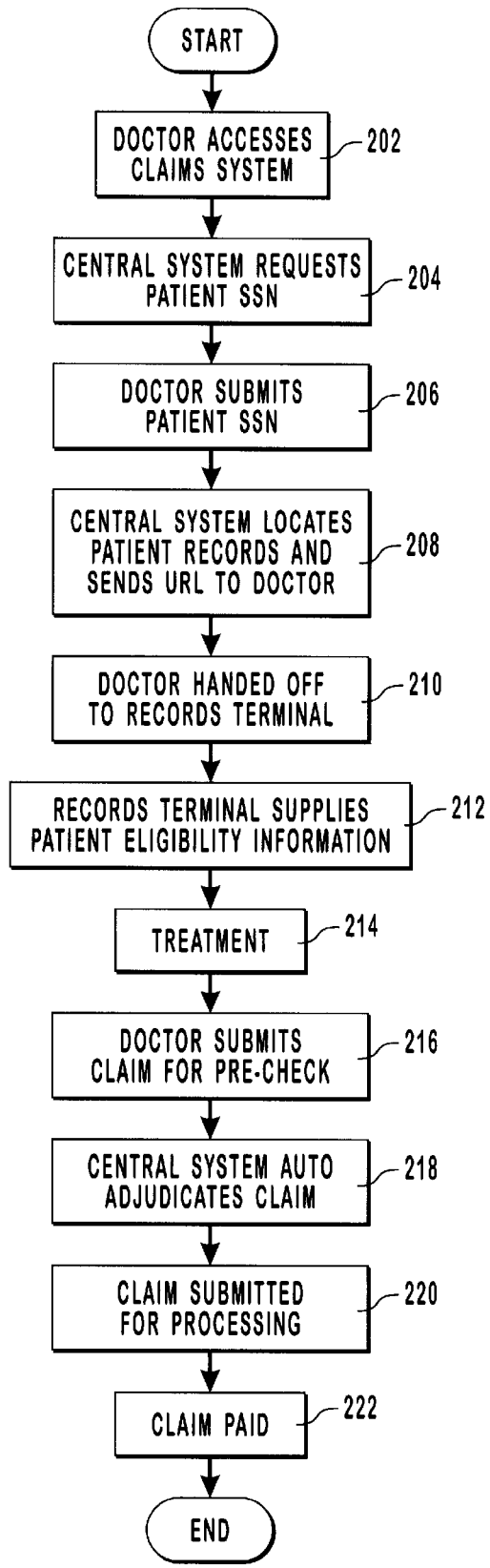
FIG. 11 is a flow diagram depicting selected steps of a method of submitting claims for prechecking and payment using the system of FIG. 10.

FIGS. 10 and 11 relate to another specific example of submitting claims for prechecking and payment using the Internet. According to step 202, before a doctor treats a patient, the doctor accesses the claims processing system of this embodiment by means of a doctor's terminal 230. In particular, the doctor or medical personnel at the doctor's office access a central system terminal 232 via Internet infrastructure 234. Central system terminal 232 may be operated, for example, by the entity that administers the claims processing system of the invention. Furthermore, central system terminal 232 may include any suitable computer and, in one embodiment, includes an IBM AS/400 computer.

In step 204, central system terminal 232 requests a social security number associated with the patient or another patient identifier. This request is transmitted through Internet infrastructure 234 to doctor's terminal 230, where an appropriate display is generated. In response, patient social security number is transmitted in step 206 from doctor's terminal 230 to central system terminal 232, thereby identifing the patient for whom treatment is about to be made. Next, central system terminal 232 references a records location database 236, which identifies the location at which patient eligibility records associated with the patient are stored. For example, patient eligibility and other patient records may be stored at a third location separate from the site of the central system terminal 232.

In this example, records location database 236 informs the system that the eligibility records associated with the patient are available at records terminal 238. Consequently, central system terminal 232 identifies a Uniform Resource Locator ("URL") that may be used to access records terminal 238 and sends the URL to doctor's terminal 230 in step 208. Doctor's terminal 230 then uses the URL as an Internet address to access records terminal 238 and, in step 210, the doctor's terminal is in effect handed off from central system terminal 232 to the records terminal. Like central system terminal 232, records terminal 238 may include a suitable computer, which in one embodiment is an IBM AS/400 computer. As illustrated by step 212, records terminal 238 supplies eligibility and other patient information to doctor's terminal 230 according to the invention as described herein. For example, the eligibility information may be stored in a patient eligibility database 240 and made available to records terminal 238. Thus, the doctor or other medical personnel may view and retrieve patient and insurance plan eligibility information on doctor's terminal 230 before treatment is provided.

In step 214, the doctor provides the appropriate treatment to the patient after having been informed of the patient's eligibility and other relevant information. According to step 216, the doctor or other medical personnel can edit and prepare the health claim after the patient has been treated using doctor's terminal 230, and can then submit the claim for prechecking or auto adjudication as previously described herein. In this example, the claim is sent to central system terminal 232, where it is subjected to a claim precheck system 242 as illustrated by step 218.

The central system terminal then informs the doctor's terminal 230 of the results of the prechecking or auto adjudication. In step 220, the claim is then submitted to a claim processor 244 for payment or for further processing and approval or rejection according to the invention as described herein. Claim processor 244 is also accessible via Internet infrastructure 234 in this embodiment. Depending on the final adjudication of the claim, claim processor 244 may then initiate payment through electronic funds transfer or by mailing a check to the doctor. In the foregoing manner, this embodiment of the invention provides automated patient eligibility information, claim prechecking, claims editing, and claims payment. The use of the Internet makes the system and method very flexible and easily applicable to doctor's offices in virtually any location. Furthermore, it is to be understood that the features of the other embodiments may also be incorporated into the example described above in reference to FIGS. 10 and 11.

It should be understood that the systems and method of the invention are not limited to the specific embodiments described herein. For example, the methods for determining whether a claim is to be automatically or manually adjudicated before submission of the claim may be combined with other claims processing systems beyond those described herein. In particular, the invention extends to conventional claims processing systems in combination with the novel systems for prechecking the adjudication status of a proposed claim. In addition, claims processing systems having a payment tracking system described herein for allowing a health care provider to monitor the payment status of a submitted claim can be combined with other claims processing systems beyond those specifically disclosed in this document. Furthermore, the invention extends to other selected elements, such as the system by which health care provider may download partially prepared claims forms, in combination with conventional claims processing systems. Those skilled in the art will recognize that various combinations of the elements disclosed herein are novel and are encompassed by the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system comprising a health care benefit component that stores patient and benefit information and allows access to stored information by a health care provider, an automated adjudication component that automatically adjudicates claims submitted for payment, an automated payment component that automatically pays adjudicated claims, a payment tracking component that tracks the status of claims submitted for automatic payment, and an access terminal associated with the health care provider, a method for submitting and adjudicating claims comprising the steps of:

accessing, using the access terminal, the patient and benefit information stored by the health care benefit component such that the health care provider can ascertain patient information in preparation for submitting a claim for treatment provided to a patient;

creating, using the access terminal, the claim by entering information regarding treatment provided to said patient into an electronic claim form that can be submitted for payment;

testing the adjudication status of said claim, so that before said claim is submitted for adjudication, said health care provider may know whether said claim is to be manually adjudicated by an adjudicator or whether said claim is to be automatically adjudicated;

transmitting said claim from the access terminal, thereby submitting said claim for adjudication; and if said claim is to be automatically adjudicated and paid automatically, then tracking the payment status of said claim using the access terminal.

2. A method for submitting and adjudicating claims as recited in claim 1, further comprising, prior to transmitting said claim for adjudication, the steps of:

modifying, using the access terminal, the information in the claim in order to change the adjudication status of the claim; and then re-testing the adjudication status of the claim.

3. A method for submitting and adjudicating claims as recited in claim 1, further comprising, if the claim is to be paid automatically, the step of initiating payment of the claim by the automated payment component by transmitting information that ultimately results in an electronic transfer of finds to said health care provider.

4. A method for submitting and adjudicating claims as recited in claim 1, further comprising the step of forwarding the claim to a claims processing location for adjudication and payment if the claim is to be manually adjudicated by the adjudicator.

5. A method for submitting and adjudicating claims as recited in claim 1, further comprising the steps of:

determining the parties responsible for payment of the claim; and forwarding, from the automated adjudication component to at least one of said parties, a request for electronic payment of a first portion of the claim and forwarding, from the automated adjudication component to at least another of said parties, a printed invoice for payment of a second portion of the claim.

6. A method for submitting and adjudicating claims as recited in claim 1, further comprising the step of the automated adjudication component producing an explanation of benefits identifying the treatment provided and the ultimate disposition of the claim, including the amount paid by each party responsible for payment.

7. In a system comprising a health care benefit component that stores patient and benefit information and allows access to stored information by a health care provider, an automated adjudication component that automatically adjudicates claims submitted for payment, an automated payment component that automatically pays adjudicated claims, payment tracking component that tracks the status of claims submitted for automatic payment, and an access terminal associated with the health care provider, a method for submitting and adjudicating claims comprising the steps of:

accessing, using the access terminal, the patient and benefit information stored by the health care benefit component such that the health care provider can ascertain patient information in preparation for submitting a claim for treatment provided to a patient;

creating, using the access terminal, the claim by entering information regarding treatment provided to said patient into an electronic claim form that can be submitted for payment;

testing the adjudication status of said claim so that before said claim is submitted for adjudication, said health care provider may learns that, without modification of the claim, the claim is to be manually adjudicated by an adjudicator as opposed to being automatically adjudicated;

receiving, using the access terminal, input modifying said claim in order to change the adjudication status of said claim;

re-testing the adjudication status of the modified claim so that before said modified claim is submitted for adjudication, said health care provider learns that said modified claim is to be automatically adjudicated and how much said health care provider is to be paid;

transmitting said modified claim from the access terminal to said automated adjudication component for automatic adjudication; and tracking the payment status of said modified claim by communicating with said payment tracking component using the access terminal.

8. A method for submitting and adjudicating claims as recited in claim 7, further comprising the steps of:

determining the parties responsible for payment of the claim; and forwarding, from the automated adjudication component to at least one of said parties, a request for electronic payment of a first portion of the claim and forwarding, from the automated adjudication component to at least another of said parties, a printed invoice for payment of a second portion of the claim.

9. A method for submitting and adjudicating claims as recited in claim 7, further comprising the step of the automated adjudication component producing an explanation of benefits identifying the treatment provided and the ultimate disposition of the claim, including the amount paid by each party responsible for payment.

10. In an environment wherein a patient visits a health care provider for the purpose of receiving treatment and wherein the health care provider submits claims for payment for provided treatment to a payor who is responsible for paying at least a portion of the treatment costs, a system for providing health benefit information to the health care provider and for interactively adjudicating claims for payment and for making automated payment of adjudicated claims comprising:

means for storing health benefit information comprising (1) patient identifying information to identify a patient and (2) health benefit information that allows a health care provider to determine benefit coverage for said patent;

means for said health care provider to access said health benefit information in order to ascertain the benefit status of said patient prior to treatment of said patient;

means for said health care provider to electronically generate a claim for payment for treatment provided to said patient;

means for said health care provider to determine the adjudication status of said claim, so that before said claim is submitted for adjudication, said health care provider knows whether said claim is to be manually adjudicated by an adjudicator or whether said claim is to be automatically adjudicated; and means for electronically submitting said claim for adjudicating.

11. A system as recited in claim 10, further comprising means for sending claims that are to be manually adjudicated to an entity for manual adjudication.

12. A system as recited in claim 10, further comprising means for enabling the health care provider to track the payment status of claims that have been submitted for adjudication.

13. A system as recited in claim 10, further comprising means for initiating payment of adjudicated claims.

14. A system as recited in claim 13, wherein said means for initiating payment comprises means for initiating electronic transfer of funds.

15. A system as recited in claim 13, wherein said means for initiating payment comprises means for printing a paper invoice to be sent through the mail.

16. A system as recited in claim 10, further comprising means for sending an explanation of benefits that describes the treatment provided, the amount to be paid for the treatment, and the party responsible for payment.

17. A system as recited in claim 10, wherein said means for said health care provider to determine the adjudication status comprises a database describing the benefits available and the contractual obligations of said payor to pay said health care provider for treatment rendered.

18. A system as recited in claim 10, wherein the means for said health are provider to generate a claim further comprise means for enabling the health care provider to modify said claim in order to change the adjudication status of said claim prior to submission of the claim for adjudication.

19. In an environment wherein a patient visits a health care provider for the purpose of receiving treatment and wherein the health care provider submits claims for payment for provided treatment to a payor who is responsible for paying at least a portion of the treatment costs, a system for providing health benefit information to the health care provider and for interactively adjudicating claims for payment and for making automated payment of adjudicated claims comprising:

means for storing health benefit information comprising (1) patient identifying information to identify a patient and (2) health benefit information that allows a health care provider to determine benefit coverage for said patent;

means for said health care provider to access said health benefit information in order to ascertain the benefit status of said patient prior to treatment of said patient;

means for said health care provider to electronically generate a claim for payment for treatment provided to said patient;

means for said health care provider to determine the adjudication status of said claim, so that before said claim is submitted for adjudication, said health care provider knows whether said claim is to be manually adjudicated by an adjudicator or whether said claim is to be automatically adjudicated; and means for modifying said claim prior to submitting the claim for adjudication in order to change the adjudication status of said claim if it is otherwise determined that the claim is to be manually adjudicated;

means for electronically submitting said claim for adjudicating; and means for enabling the health care provider to track the payment status of claims that have been submitted for adjudication.

20. A system as recited in claim 21, further comprising means for sending claims that are to be manually adjudicated to an entity for manual adjudication.

21. A system as recited in claim 20, wherein said means for said health care provider to determine the adjudication status utilizes custom rules provided by the payor to determine whether said claim is to be automatically adjudicated or manually adjudicated.

22. A system as recited in claim 21, further comprising means for initiating payment of adjudicated claims.

23. A system as recited in claim 22 wherein said means for initiating payment comprises means for initiating electronic transfer of funds.

24. A system as recited in claim 23, wherein said means for initiating payment comprises means for printing a paper invoice to be sent through the mail.

25. A system as recited in claim 24, further comprising means for sending an explanation of benefits that describes the treatment provided, the amount to be paid for the treatment, and the party responsible for payment.

26. A system as recited in claim 25, wherein said means for said health care provider to determine the adjudication status comprises a database describing the benefits available and the contractual obligations of said payor to pay said health care provider for treatment rendered.

27. In an environment wherein a patient visits a health care provider for the purpose of receiving treatment and wherein the health care provider submits claims for payment for provided treatment to a payor who is responsible for paying at least a portion of the treatment costs, a system for providing health benefit information to the health care provider and for interactively adjudicating claims for payment and for making automated payment of adjudicated claims comprising:

a health benefit system adapted to allow electronic access to patient and benefit information, comprising:
        a benefit database comprising
            patient information which identifies individuals eligible for benefits,
            benefit information which identifies the benefits available in sufficient detail to allow health care professionals and other individuals to determine, for each potential patient, particular covered or uncovered benefits, and
            health care provider information that allows potential patients to identify particular health care providers that can be used to receive treatment covered by the benefits;
        a benefit entry and modification module that allows entry and modification of said patient and benefit information; and
        a database access module that allows access to the information stored in the benefit database from locations remote to the benefit database;

a health care claim entry system comprising:
        a claim entry module that allows a health care professional to enter information regarding treatment provided to a patient in order to create a claim that can be submitted for payment;
        a claim modification module that allows the health care professional to modify information in a claim prior to submission of the claim for adjudication and payment;
        a claim adjudication status module that allows the health care professional to check the adjudication status of a claim prior to submission of the claim for adjudication so as to learn at least (1) whether the claim, if submitted for adjudication, is to be adjudicated manually by an adjudicator or adjudicated automatically, and (2) if a claim is to be adjudicated automatically, the amount of payment that is to be received for the claim; and
        a claim submission module that submits a claim for processing; and an automated claims adjudication system comprising:
        a claim adjudication status check module that receives a request to test the adjudication status of a claim and returns, in response to the request, the adjudication status including at least (1) whether the claim, if submitted for adjudication, is to be adjudicated manually by an adjudicator or adjudicated automatically, and (2) if a claim is to be adjudicated automatically, the amount of payment that is to be received for the claim; and
        a claim processing module that receives submitted claims, determines whether the claim is to be adjudicated manually by and adjudicator or adjudicated automatically and (1) if the claim is to be adjudicated manually, sending the claim to the appropriate location for manual adjudication and (2) if the claim is to be adjudicated automatically, determining the amount of payment that should be made for the claim, determining the source of the payment, and then initiating payment of the claim.

\* \* \* \* \*

UNITED STATES PATENT AND TRADEMARK OFFICE
CERTIFICATE OF CORRECTION

PATENT NO. : 6,343,271 B1     Page 1 of 1
DATED : January 29, 2002
INVENTOR(S) : Brian E. Peterson, John W. Kwant, Jr., Vaughn C. Cecil and Wayne A. Provost It is certified that error appears in the above-identified patent and that said Letters Patent is hereby corrected as shown below:

<u>Title page,</u>
Item [57], ABSTRACT,
Line 13, after "provider may" insert -- modify --

<u>Column 4,</u>
Line 7, after "allows" change "patient" to -- patients --

<u>Column 9,</u>
Line 43, after "manually" change "adjudicate" to -- adjudicatable --

<u>Column 15,</u>
Line 35, after "sends" change "fall" to -- full --

<u>Column 18,</u>
Line 21, after "of" change "finds" to -- funds --
Line 64, after "provider" delete "may"

Signed and Sealed this

Twenty-seventh Day of August, 2002

*Attest:*

JAMES E. ROGAN
*Director of the United States Patent and Trademark Office*

*Attesting Officer*

(12) EX PARTE REEXAMINATION CERTIFICATE (10188th)

United States Patent
Peterson et al.

(10) Number: US 6,343,271 C1
(45) Certificate Issued: Jun. 12, 2014

(54) ELECTRONIC CREATION, SUBMISSION, ADJUDICATION, AND PAYMENT OF HEALTH INSURANCE CLAIMS

(75) Inventors: Brian E. Peterson, Salt Lake City, UT (US); John W. Kwant, Jr., Midvale, UT (US); Vaughn C. Cecil, Crossville, TN (US); Wayne A. Provost, Salt Lake City, UT (US)

(73) Assignee: PPS Data, LLC, Salt Lake City, UT (US)

Reexamination Request:
No. 90/011,977, Nov. 14, 2011

Reexamination Certificate for:
Patent No.: 6,343,271
Issued: Jan. 29, 2002
Appl. No.: 09/118,668
Filed: Jul. 17, 1998

Certificate of Correction issued Aug. 27, 2002

(51) Int. Cl.
*G06Q 40/00* (2012.01)
*G06Q 40/08* (2012.01)

(52) U.S. Cl.
CPC ..................................... *G06Q 40/08* (2013.01)
USPC .................................................. 705/4; 705/2

(58) Field of Classification Search
None
See application file for complete search history.

(56) References Cited

To view the complete listing of prior art documents cited during the proceeding for Reexamination Control Number 90/011,977, please refer to the USPTO's public Patent Application Information Retrieval (PAIR) system under the Display References tab.

*Primary Examiner* — Jeffrey Carlson

(57) ABSTRACT

A claims processing system for electronically reviewing and adjudicating medical insurance claims. The claims processing systems include a benefits system, an automated adjudication system, a payment system, and a payment tracking system. The benefits system allows patients and health care providers to access patient and benefits information on-line. Using the automated adjudication system, health care providers may electronically prepare and submit claims for payment. Before a claim is submitted, a claims precheck process is used to determine whether the claim may be automatically adjudicated or instead must be manually adjudicated. If manual adjudication is indicated, the health care provider may modify the claim in an effort to achieve automated adjudication prior to claim submission. The claims processing system performs automatic adjudication on submitted claims or forwards the claims to a shop for manual adjudication. The payment system initiates payment to the health care provider using electronic funds transfer. The payment tracking system allows health care providers to monitor the payment status of a claim after submission.

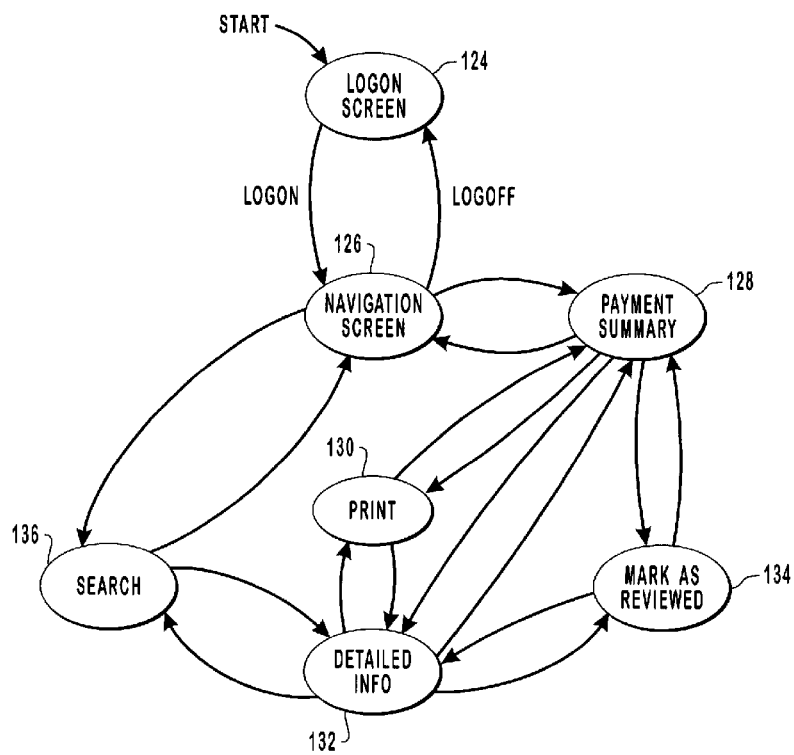

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 2, 7, 10, 12 and 17-19 are cancelled.

Claims 3-6, 8, 9, 11, 13-16 and 20-27 were not reexamined.

\* \* \* \* \*